(No Model.) 2 Sheets—Sheet 1.

M. KANE.
SAFETY WHEEL ATTACHMENT FOR HARVESTERS.

No. 489,012. Patented Jan. 3, 1893.

Witnesses.
E. T. Wray
Jean Elliott

Inventor.
Maurice Kane
By Burton and Burton
his attys (No Model.)
2 Sheets—Sheet 2.

M. KANE.
SAFETY WHEEL ATTACHMENT FOR HARVESTERS.

No. 489,012. Patented Jan. 3, 1893.

Witnesses.
E. T. Wray.
Jean Elliott

Inventor
Maurice Kane
By Burton and Burton
his attys

UNITED STATES PATENT OFFICE.

MAURICE KANE, OF CHICAGO, ILLINOIS.

SAFETY-WHEEL ATTACHMENT FOR HARVESTERS.

SPECIFICATION forming part of Letters Patent No. 489,012, dated January 3, 1893.

Application filed June 16, 1892. Serial No. 436,980. (No model.)

*To all whom it may concern:*

Be it known that I, MAURICE KANE, a citizen of the United States, residing at Chicago, county of Cook, and State of Illinois, have invented certain new and useful Improvements in a Safety-Wheel Attachment for Harvesters, which is fully set forth in the following specification, reference being had to the accompanying drawings, forming a part thereof.

The purpose of this invention is to provide a wheel attachment for harvesters, which shall permit the entire machine to be tilted downward at the discharge side so as to throw the platform and grain wheel up in position to permit the entire machine to pass through a gate too narrow to permit it to pass when traveling with the grain wheel on the ground.

A secondary purpose of the invention is to adapt such a wheel to arrest the machine when it might be tipped over toward the discharge side and dislodge the driver and damage the binder when operating on a side-hill with the binder at the lower side.

Figure 1:
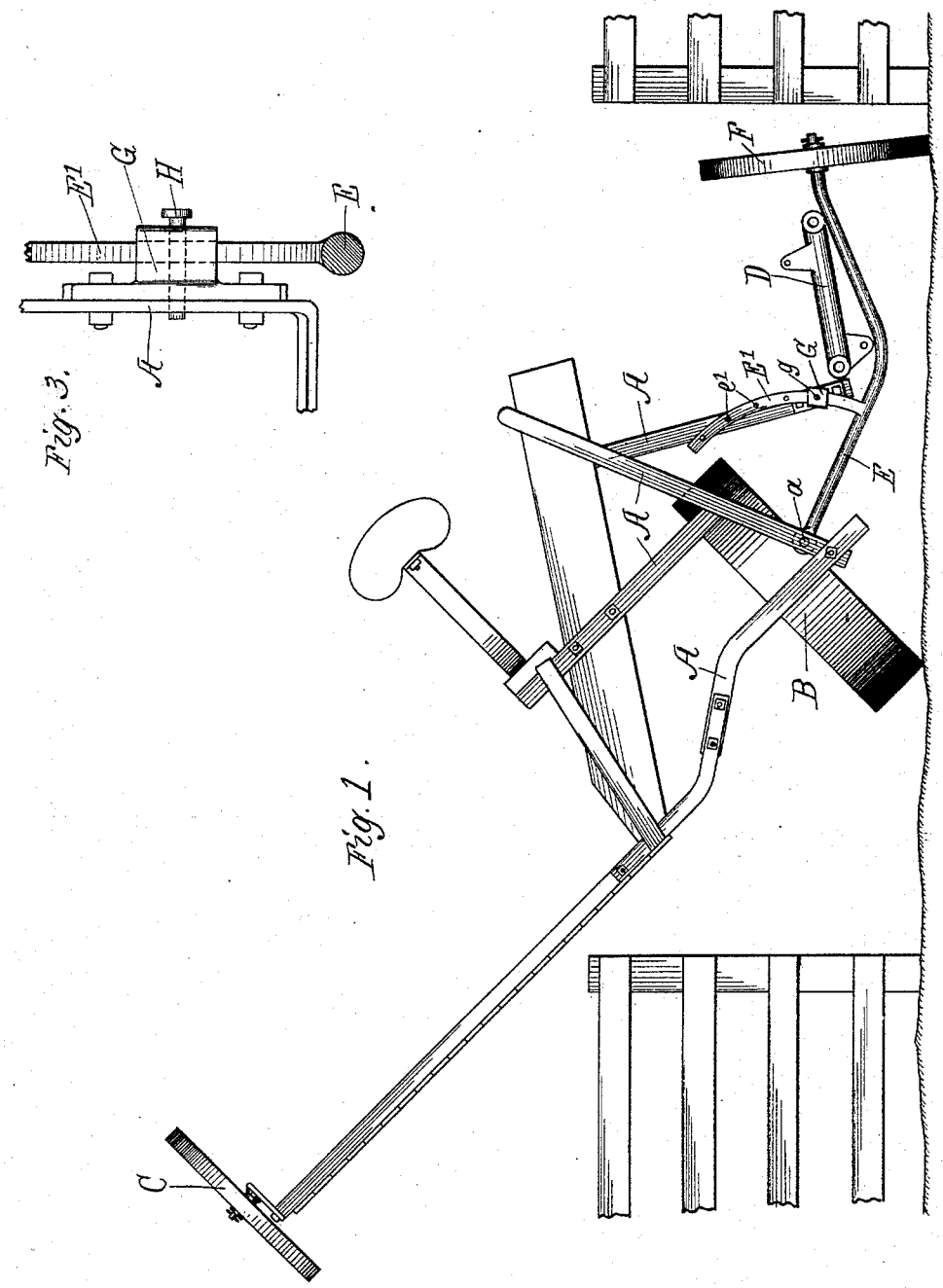
Figure 2:
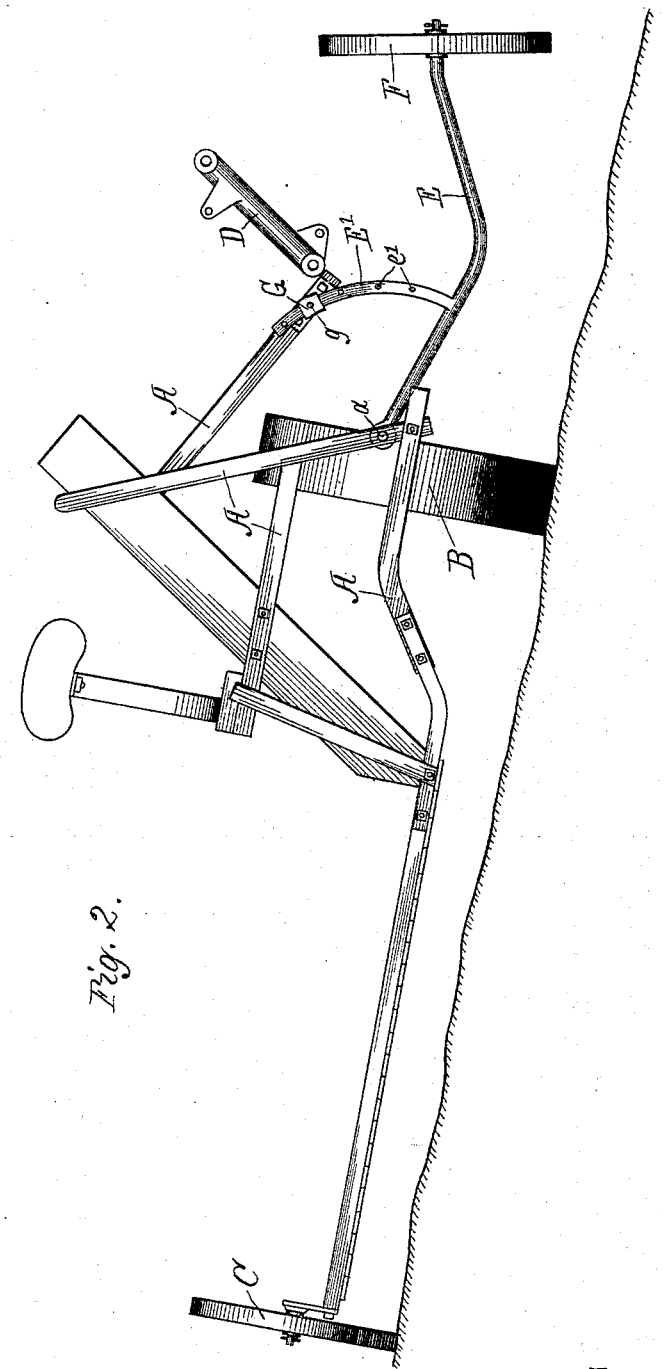

Figure 1 is a rear elevation of the frame of a harvester having my invention attached to it, and shown in the position at which it may be passed through a gate, as described. Fig. 2 is a view of the same machine with the wheel attachment adjusted to operate as a safety or check wheel when the machine is traveling upon a side-hill. Fig. 3 is a detail elevation of a loop or sleeve on the harvester frame, through and by means of which the safety wheel is adjustably secured at different positions.

A A represent conventionally various parts of the harvester frame; B, the drive wheel; C, the grain wheel; D, the binder frame.

E is an arm which is pivoted to any convenient point of the harvester frame, as at $a$, and extends toward the discharge side underneath the binder frame, being shaped as may be necessary to pass all the protruding portions of the mechanism, and being adapted to come into contact with the upper arm of the binder frame or the upper end of the standard of said frame, as seen in the drawings. Upon the end of this arm E, there is mounted a wheel F. From the said arm E, intermediate its pivot and the wheel F, I prefer to provide a segmental arm E′, extending in an arc about the pivot of the arm E, and passing through the sleeve G, which is secured at any convenient point on the harvester frame. The arm E′ has a number of holes $e'$ at different points in its length, and the sleeve G is correspondingly provided with the hole $g$, and a pin H is provided to be inserted through the hole $g$, and any one of the holes $e'$, which may be made to register with it and so secure the arm E at such position as desired with respect to the harvester frame.

In Fig. 1, the position shown is that which permits the machine to be tilted farthest toward the discharge side, the binder frame being in contact with the arm E near the wheel F, so that said arm takes the weight of the machine at that side while it is thus tilted.

Fig. 2 shows the arm E adjusted to such position that the machine cannot be tilted very far before the wheel F will strike the ground.

In any adjustment except that shown in Fig. 1, the weight of the discharge side will be received on the pin H, and transmitted to the wheel F.

I do not limit myself to the specific use of an adjustable wheel or an adjustable arm carrying a wheel, though in order to accomplish both the purposes in the easiest manner such a construction may be desirable, nor, in the use of the adjustable wheel, do I limit myself to the mode of attaching the arm or adjusting the same; but

I claim:—

1. In combination with the harvester and binder frames, an arm securd to one of them and extending transversely to the line of travel past the upper and outer side of the binder frame to permit said upper and outer side to be lodged upon it, and having a wheel mounted upon it beyond the point at which such lodgment is afforded: substantially as set forth.

2. In combination with the harvester and binder frames, an arm pivoted to one of said frames and extending transversely to the line of travel underneath the binder frame a distance measured in a straight line greater than the distance similarly measured to the upper and outer side of the binder frame, whereby said arm is adapted to be swung about its pivot against said upper and outer side; a wheel mounted on said pivoted arm beyond the limit of said distance from its pivot, and suitable means for securing the arm relatively to said frames in positions to which it may be adjusted on its pivot: substantially as set forth.

In testimony whereof I have hereunto set my hand, in the presence of two witnesses, at Chicago, Illinois, this 7th day of June, 1892.

MAURICE KANE.

Witnesses:
    CHAS. S. BURTON,
    JEAN ELLIOTT.